United States Patent [19]

Collins

[11] 3,774,201
[45] Nov. 20, 1973

[54] TIME COMPRESSION SIGNAL PROCESSOR
[75] Inventor: John D. Collins, Burlington, Mass.
[73] Assignee: Raytheon Company, Lexington, Mass.
[22] Filed: Dec. 17, 1970
[21] Appl. No.: 99,294

Related U.S. Application Data
[63] Continuation of Ser. No. 787,314, Dec. 27, 1968, abandoned.

[52] U.S. Cl. .................. 343/5 DP, 343/17.2 PC
[51] Int. Cl. .......................... G01s 7/30, G01s 9/02
[58] Field of Search ............... 343/5 DP, 17.2 PC, 343/8, 9

[56] References Cited
UNITED STATES PATENTS
3,623,096  11/1971  Morris ........................... 343/9 X
3,333,247   7/1967  Hadley et al. ................. 343/5 DP
3,337,870   8/1967  Allen et al. ...................... 325/65 X
3,292,175  12/1966  Brandon ..................... 343/17.2 PC
3,150,368   9/1964  Price ........................... 343/17.2 PC
3,388,377   6/1968  Folsom et al. .................. 343/5 DP

Primary Examiner—Malcolm F. Hubler
Attorney—Harold A. Murphy and Joseph D. Pannone

[57] ABSTRACT

A time compression system used for spectrum analysis of multi-channel digital systems in which there are X identical input channels and Y identical filters. Each input is sampled in parallel and then quantized with an analog-to-digital converter. The inputs are then stored channel by channel in a random access memory. Readout is interleaved simultaneously with the writing and each channel is readout serially. The stored digital signals are converted back to serial analog signals and fed to a single bank of filters for spectrum analysis.

9 Claims, 21 Drawing Figures

INVENTOR
BY Irving S. Rappaport
ATTORNEY

$f_o$ IMS DRIVE PULSE
FIG. 6A

$f_o - 2088$ KC TIME RESPONSE
FIG 6B

$f_o + 1044$ KC FILTER RESPONSE
FIG. 6C $f_o$ FILTER RESPONSE
FIG 6D $f_o + 1044$ KC FILTER RESPONSE
FIG. 6E $f_o + 2088$ KC FILTER RESPONSE
FIG. 6F

FIG. 6G

FREQUENCY

INVENTOR
JOHN D. COLLINS

BY Irving S. Rappaport
ATTORNEY

INVENTOR
JOHN D. COLLINS
BY Irving S. Rappaport
ATTORNEY

FIG. 13

TIME COMPRESSION SIGNAL PROCESSOR

RELATED CASES

This is a continuation application Ser. No. 787,314, filed Dec. 27, 1968, now abandoned, by John D. Collins and assigned to the same assignee as this invention.

Application Ser. No. 129,218 (continuation of Ser. No. 787,506, filed Dec. 27, 1968, now abandoned), entitled Time Compression Signal Processor, filed Mar. 29, 1971 by John D. Collins, and application Ser. No. 174,221 (continuation of Ser. No. 787,504, filed Dec. 27, 1968, now abandoned), entitled Time Compression System Adding Noise to Allow One Bit Quantization, filed Aug. 23, 1971 by John D. Collins, both assigned to the same assignee as this application, are hereby incorporated by reference and made a part of this application.

BACKGROUND OF THE INVENTION

There is frequently a requirement for the simultaneous processing of signals from a number of channels, such as coherent radars and sonar systems with multiple antenna beams, range gates, velocity gates, etc. One prior art approach is to use an identical processor for each channel. In the radar case, the processor is generally a group of filters utilized to enhance the signal in a background of noise and clutter with narrow band filtering. If it is a wide-band system due to ranging modulation on the transmitter, a group of cross-correlation devices would replace the bank of filters. For example, velocity or frequency resolution is proportional to observation time, while range or time resolution is proportional to bandwidth. For the radar or sonar that requires high resolution in both velocity and range, a cross-correlator or range gate would be required for each antenna beam, and a bank of doppler filters is used for each range gate. Some systems in this class are: pulse doppler, FM/CW and pseudo random noise radar. The cross-correlator is a device whose output depends on time delay, while a doppler filter output is a function of the first derivative of time delay or range rate.

The total system requirement, or the number of independent bins, is the product of the number of antenna beams, range gates, and velocity filters that must be processed simultaneously. If a search mode is used in azimuth, elevation, range or velocity, the bins can be reduced by time sharing. The sensitivity is also reduced by the same factor since integrated signal energy, as compared to noise, is reduced if it is assumed that the target is illuminated continuously in time.

Time compression, a technique of parallel to serial conversion in the time domain, can be applied to any of these systems to reduce the number of processors in proportion to the compressor factor. Time compression can be used for spectrum analysis of multi-channel systems to reduce the number of filters and the analysis time. Some prior art methods utilize analog recording on magnetic tape, film, or drums. Generally speaking, time compression is accomplished by reading the stored data out at a faster rate than it was stored. Prior art time compression systems include the Deltic, which is a delay line time compressor, and a coherent memory filter. These devices can be used to perform a spectrum analysis of a single channel effectively without the need for a large number of parallel filter channels. However, these devices are not adapted for present coherent radars and multi-channel processor systems. One prior art time compression system uses a special transfluxer memory array as opposed to a standard random access memory as used by the present invention. In addition, this prior art system employs analog samples from a single signal source while the present invention utilizes digital samples from a plurality of signal sources.

A coherent radar system capable of tracking several targets at once, or alternately capable of searching for an unknown target at an unknown distance, contains a large number of channels, or receivers, each tuned to a different distance. As the radar acquires real or false targets, these receivers continually produce signatures—unusual or even unique frequency patterns—that have to be analyzed to determine the various targets' velocity, acceleration, and other characteristics. The analysis, in general, must be performed as fast as the signals come in; recording the signatures for later analysis won't help if the targets are capable of destroying the radar.

Without time compression, the only way to keep track of all the targets in real time is to attach to each channel a complete processor consisting of a bank of narrowband filters and an associated computer. This approach is too expensive and entails too much equipment when more than a few channels are involved. Some radar systems have been designed around multiple processors, but all these networks are relatively large and complex.

If a system were just a single channel, but many range or velocity bins were to be analyzed, and the requirement was to use only one gate, the time compressor would record the signal and play it into the gate many times faster than real time, such that every desired bin is examined by the gate in sequence. While the signal is being read out of the storage medium at this faster rate on a continuous basis, the input is also continuously recorded to prevent loss of signal energy. The required compression ratio is equal to the number of separate bins that must be examined in sequence if a single gate is time shared. If two or more gates are used, the compression ratio can be reduced in proportion.

A more common system solution is the case where they are, for example, M input channels and P gates required for each channel. The product MP might typically be many thousands, and time compression by this factor to allow a single gate is usually not practical since the signal bandwidth is also increased by the compression factor. Compression by M the number of channels is usually a good choice since a single bank of P gates can be timed shared among M channels. Another reason for this particular choice is that the signals stored in the memory for each channel need be used only once and discarded. For example, if P/2 filters were used, only half the signal range or, in effect, half a channel could be examined at a time required the stored signal from that channel to be placed back in the memory for a second processing for the other half of the signal range. In memories that are destructive read-out, or erase before record, there is a loss in speed of operation by a factor of two.

With analog memory, the signals are recorded continuously in time and all levels of amplitude are retained within the degree of fidelity of the device. This is an inefficient way of using a memory, since sampling theory allows signals to be represented by instantaneous samples (as narrow in time as you please) taken at discrete times to represent the signal with sufficient quality for most practical purposes. This allows the samples to be stacked closer together than they originally existed. The practical limit is bandwidth, since the narrower the sample, or pulse, the greater the bandwidth.

Another advantage of sampling is that it allows many operations to be interlaced in time and, yet, have, in effect, many simultaneous operations with the same memory. If the memory is random access, the samples can be rearranged in any fashion desired within practical limits of the device.

Digital computer technology has developed, and is still developing, random access memory devices that are capable of high-speed operation, allowing time compression by closely stacking samples or a rearrangement of the order from which they were originally recorded. Magnetic cores in a three-dimensional matrix is just one example of a random access device that is economical and reliable because of extensive development and usage. It also has the advantage of high-speed and all-electronic operation.

Although analog samples can be stored in some types of memories, a more reliable approach is binary or two-level memory, since far greater manufacturing and environmental tolerances are possible in order to determine one of two levels rather than a range of levels. Conventional analog-to-digital conversion techniques can be used to convert the samples to a group of N binary levels. The number of permissible levels without interpolation is $2^N$ where N is the number of bits (0 or 1) per sample. Binary memory requires the use of N times as many memory elements as analog memory in addition to an analog-to-digital converter and a digital-to-analog converter at the output to reconstruct the analog sample.

If the signals are narrow band in comparison with noise, clutter, or random signals, and are small in amplitude as compared to the noise, clutter and other wide-band random signals, a special form of zero crossing limiting occurs when only polarity samples are stored such that the signal information is retained as if analog samples were stored, except for a small loss in signal-to-noise and clutter ratio.

This special case is useful in radar and sonar systems where signals are, in effect, buried in relatively wide-band noise and clutter. A further advantage is that the noise and clutter voltage is held constant independent of the gain of devices prior to the time compression sampler, allowing a constant false alarm rate (CFAR) to be obtained with a fixed voltage threshold at the detector.

A spectrum analyzer can be constructed by adding noise purposely in a signal free region such that limiting with polarity samples occur on the noise and the signals in the noise-free region are retained linearly. In this way, a spectrum analyzer can be produced using a small number of filters time shared with one bit polarity samples stored in the memory device by virtue of limiting on the added noise. The noise would be generally added in a frequency region higher than the signals of interest such that harmonics of the noise would not be introduced in the signal region. The sampling rate must be chosen high enough to prevent folding of the noise into the signal region. In order to keep the added noise frequency region small compared to the signal region, a relatively large noise amplitude would be used. One bit quantization has an advantage over higher bit quantization as described in copending application, Ser. No. 787,504 since N times less bits must be stored and processed.

An analogous digital approach to analog time compression as described in the present invention is to sample, quantize and store the analog signals followed by the inverse process. Time compression is accomplished by making the readout rate greater than the sampling rate. There are X identical input channels and Y identical filters. Each input is sampled in parallel during the sampling time and coded with PCM. Each gate is a sample-hold circuit. The sample taken is quantized with the A-D (analog-digital) converter and stored. Next a sample is taken of the adjacent channel and it is stored, followed by the next channel, etc. The sampling is done at a rate equal to at least twice the channel bandwidth. Only a single A-D converter is usually required since its operating speed is so much greater than the required sampling rate. In other words, the bit rate must be high enough to code all channels during one sample period such that only one channel is being sampled at a time, but each is sampled at a rate equal to at least twice the bandwidth. The sample time is determined by the desired predetection bandwidth.

The memory accepts one sample signal from each of several radar channels in turn. Simultaneously with sampling of the channels, the stored samples from the first channel are read out in a continuous stream, then all the samples from the second, and so on. Thus, samples taken at, for example, milliseconds are read out in microseconds and appear to have been compressed in time. A digital-analog converter is used to convert the stored digital data to a serial analog signal. The information is then broken down into frequency components by a filter bank and analyzed by a computer to determine the range and velocity of various targets. This block readout, channel by channel, enables one filter bank to work on a time-shared basis. And because time compression raises the audio signal frequencies by a larger factor, they can be analyzed by smaller and less expensive components.

In the present invention, the timing and control circuitry is arranged so that reading and writing may be interleaved thereby allowing sample signals to be continuously analyzed without any loss of input data. One embodiment of the present invention interleaves the reading and writing having separate and static read and write address logic or programs. This embodiment can be used in general for linear scan and continuous laboratory type of spectrum analysis of multiple channels. A second embodiment has a single read and write address scheme that rotates channel and sample coordinates each frame of processing. This embodiment offers certain efficiencies which allow it to be used for step-scanning in phased arrays as well as linear scan and continuous multi-channel processing. However, because of the dynamic coordinate rotation it is limited to applications where the number of channels is an integral multiple of the number of samples taken per channel.

The time compression signal processor of the present invention is characterized by the following features and advantages as well as others: (1) A central high-speed random access memory is used for time compression and other functions on a time-shared basis. (2) The program used permits more flexible and efficient operation than other techniques for time compression. (3) Either intermittent or continuous real-time processing can be accomplished. (4) Time compression permits many channels to be processed simultaneously with a single processor. (5) Digital memory is used with analog-to-digital conversion during read out to accomplish inherent unity gain. (6) The system can operate on a one bit or higher quantization level. (7) The voltage level of the binary quantization levels are adjustable allowing a wide variation of input amplitude while retaining the maximum bits of quantization with the adjustment of a single resistor. (8) An automatic gain control system could be incorporated to adjust the quantization during analog to digital conversion to match the signal while it could be a fixed level during digital-to-analog conversion. (9) Since a random access, core memory is used for time compression; storage and time, can be made available for other functions such as target tracking, digital integration, bright display, etc. (10) Digital integration using memory words on a random access basis has been instrumented. Integration is only performed when the first threshold has been exceeded. (11) Automatic target tracking is accomplished by updating the address of the target alarms as the position of the target changes with time. (12) A random access raster is contained in the memory for temporary or permanent storage. It is readout to remote indicators at a high rate to produce a bright, flickerless pattern. (13) A linear spectrum analyzer having one bit operation by adding noise in the signal-free region such that the sampling is controlled mainly by the added noise can be employed. (14) Reading and writing may be interleaved to allow sample signals to be continuously analyzed without the loss of any input data. However, in some applications where the loss of some of the data is not critical, reading and writing may be intermittent.

SUMMARY OF THE INVENTION

The above objects, advantages and features of the present invention, as well as others, are achieved by providing a time compression signal processing system used for spectrum analysis of multi-channel systems, the system comprising means for sampling the incoming signals one channel at a time; means for time compressing the sampled signals including random access memory means for storing the signals and timing and control means for interleaving the reading out of the writing into the memory means, and spectrum analyzing means including a single filter bank operating on a time-shared basis for processing the signals in sequence.

DESCRIPTION OF THE PREFERRED EMBODIMENT

Figures 1, 3:
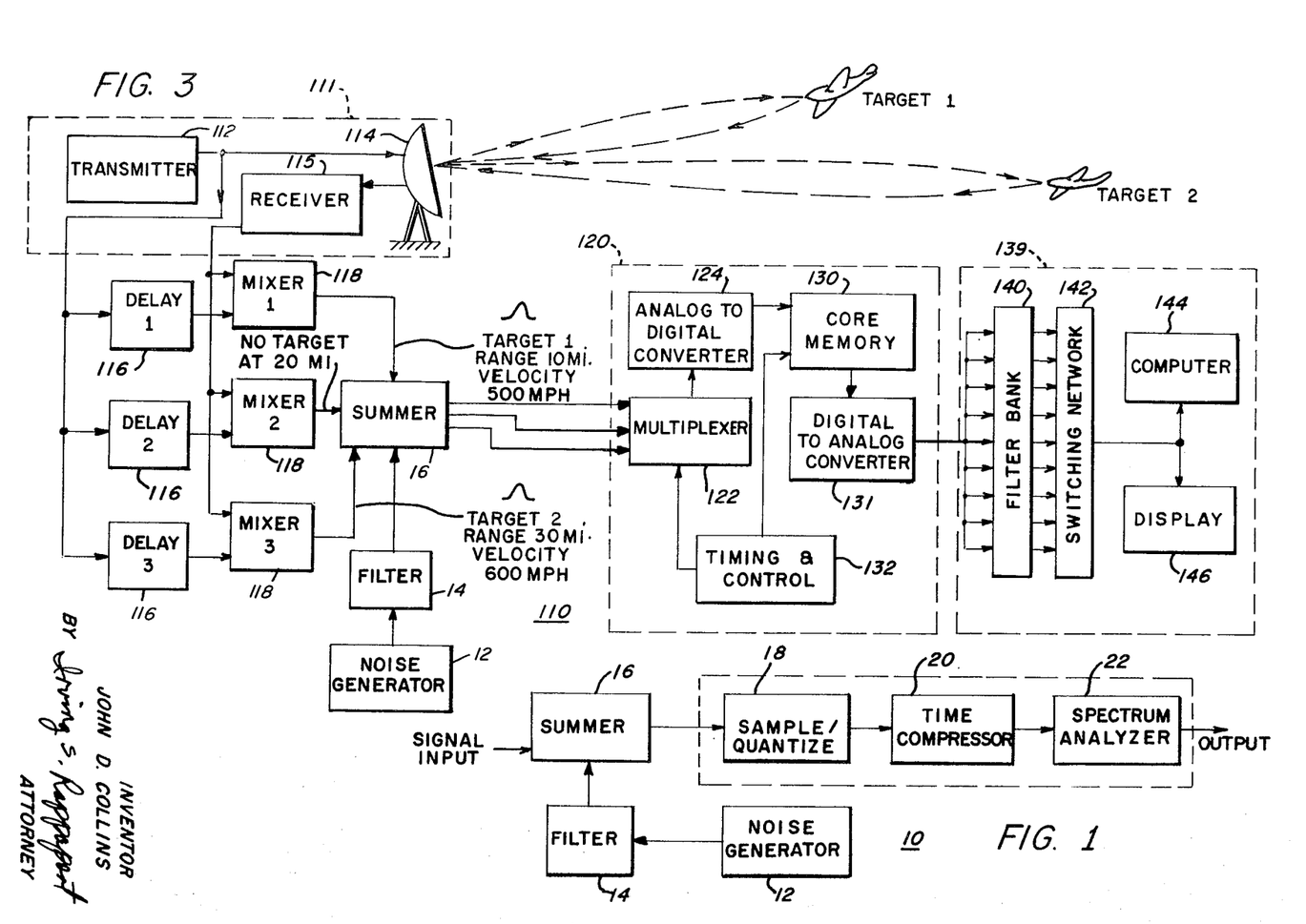
FIG. 1 is a block diagram embodying the time compression system embodying the present invention.
FIG. 3 is a more detailed block diagram of the invention in FIG. 1.

FIG. 1 shows a time compression system 10 which includes one bit spectrum analysis that permits the construction of a linear analyzer. That is, the output is proportional to the input signal and in the presence of more than one input simultaneously or a complex input there are no significant harmonics, cross-modulation products or other frequencies introduced when only polarity samples are processed.

The method is to add noise in a signal-free region and sample at such a rate that the noise does not interfere or fold into the signal region. A noise generator 12 generates noise which is applied to a filter 14. The input signal and the filtered noise are combined in a summer 16. The output from the summer is fed to sample and quantize circuitry 18. A time compressor 20 stores and speeds up polarity samples from the sample and quantize circuitry 18 (two levels, one for positive signals and another for negative signals at the tine of sampling). The noise generator 12, filter 14 and summer 16 add to the signal to be analyzed sufficient noise, in the proper bandwidth to allow the noise to act in effect as a carrier for the signal on a noninterference basis. The sample portion of circuitry 18 is a switch that closes at the sample rate for a short time compared to the period of the highest frequency and the quantizer portion of circuitry 18 makes a decision on the polarity of the signal; for example, logical 1 if positive and logical 0 if negative. The time compressor 20 is a memory capable of loading (writing in) the one bit polarity samples at the sample rate continuously and simultaneously unloading (reading out) the samples in a shorter period of time (the compression factor) by means of a time interlaced program. The signals stored are read out repeatedly enough times to allow each resolution cell of a spectrum analyzer 22 to be processed in sequence.

A key feature of the system is the added noise such that limiting occurs on the added noise that is made higher in amplitude than the signal in a different bandwidth usually higher in frequency. The bandwidth of the added noise would generally occupy a smaller bandwidth than the signal bandwidth to conserve on sample rate. The sample rate is greater than the sum of the signal and the additive noise bandwidth by a sampling factor chosen from practical sampling considerations. The loss of approximately 1 db due to limiting is eliminated with this method of spectrum analysis since the limiting occurs on the added noise rather than that associated with the targets of interest. For the case of a general-purpose laboratory spectrum analyzer no noise would be associated with the signal. The dynamic range is limited for high levels by the amount of additive noise as compared to the signal level and on the lower end by the minimum level that depends on practical design considerations. There is no theoretical limit to the minimum signal that can be processed or analyzed linearly.

At first glance, one-bit quantization would seem very ineffective as it can indicate only positive or negative, present or absent or some other binary condition. But signal amplitude is secondary in radar processing; the most important consideration is the way in which signals shift from filter to filter to indicate a target's speed, or from channel to channel to indicate changes in the target's distance from the receiver. Also, the noise usually present in radar signals has to be screened out.

Figure 2A:
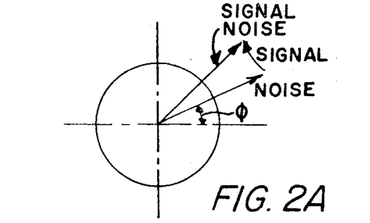
FIGS. 2A through 2C shows a graphical representation of the principle of operation of the present invention.
Figure 2B:
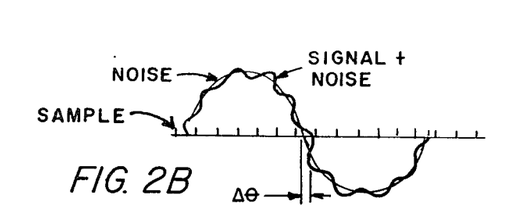
Figure 2C:
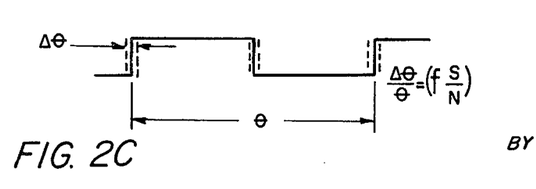

Signal-to-noise ratio is only slightly affected by the number of bits in signal quantization, as seen in the vector diagram in FIG. 2. Here a small signal vector at one frequency has been added to a large noise vector at some fundamental frequency. Because the frequencies are different, the vector representing the signal rotates about the tip of the noise vector as the noise vector rotates about the origin. Because the noise vector has a larger magnitude, the resultant rotates about the origin at a varying angular rate. The result, in this simplified case, is a noise vector phase-modulated by the signal.

The same situation is shown in the amplitude-versus-time plot just below the vector diagram. The large sine wave is the noise voltage, and the signal is superimposed on it. The result of sampling this phase-modulated signal with one-bit quantizing is a square wave as shown with some uncertainty as to the zero-crossing points. The ratio of the width of this zone of uncertainty to the period of the square wave depends on the signal-to-noise ratio, not on the amplitude of either the signal or the noise. It has been experimentally verified, the spectrum of the reconstructed waveform with one-bit and six-bit quantizing shows that little or no useful information is lost by quantizing the signal with one bit. If the memory has been designed to make the best use of one-bit quantizing, a single six-bit word could have stored six samples instead of one; other things being equal, a much higher compression ratio is then possible.

TIME COMPRESSION SIGNAL PROCESSOR

FIG. 3 shows a more detailed time compression signal processing system 110 of that shown in FIG. 1 utilized in conjunction with a coherent radar system, shown in dotted block 111, capable of tracking several targets at once, or alternately capable of searching for an unknown target at an unknown distance. For purposes of explanation, the radar system shown in dotted block 111 contains three channels 1, 2 and 3, but a larger number of channels may be employed. Each of the channels is tuned to a different distance and, as the radar system 111 acquires real or false targets, these channels continuously produce signatures in the form of unusual or even unique frequency patterns which must be analyzed to determine the velocity, acceleration and other characteristics of the various targets. In general, the analysis must be performed as quickly as the signals are received, since recordation of the signatures for later analysis will not be beneficial if the targets are capable of destroying the radar system.

One input for the time compression signal processing system 110 comes from the coherent radar system 111 including a transmitter 112, and a transmitting/receiving antenna 114 which sends out a signal and receives an echo out of phase with the transmitted wave on a receiver 115. The system in FIG. 3 shows targets 1 and 2 at different distances from the transmitter 112 and the dotted lines and arrows indicate the path of the transmitted signals and the received echo signals. For all but very short ranges, the phase differences between the transmitted signal and the received echo signal is more than one wave length. A noncoherent radar is sensitive to amplitude only, not phase.

The transmitted signal from the transmitter 112 passes through one or more delay units 116 in parallel with the transmitting antenna 114. Each delay unit 116 shown for each of the channels 1, 2 and 3 inserts a time interval equivalent to an integral number of wave lengths, and the phase difference is measured between the echo signal and the delayed transmitter signal. The amount of delay then yields a gross indication of the target's distance and the phase difference provides a more accurate indication of the target's distance. Eacy delay unit 116 corresponds to a large increment of range or distance and each delay unit 116 and its associated circuitry including a mixer 118 comprise a separate radar channel. Each of the mixers 118 has as an input, the delayed transmitted signal from its corresponding delay unit 116 and the received echo signal from the receiver 115. The outputs from each of the mixers 118 are fed to the summer 16 which also has as its input the noise generated by generator 12 and passed through filter 14. The outputs from the summer 16 are applied to time compression circuitry 120.

As a target moves toward or away from the radar system 111 the phase difference keeps changing. As peaks in the received signal successfully coincide with peaks and valleys in the transmitted signal, the phase difference itself acquires peaks and valleys, creating a difference frequency. The radar signals themselves are measured in gigahertz and the difference frequency usually in kilohertz. When the radar system 111 remains locked onto a single target, only one difference frequency is of interest and variation in this frequency corresponds to variations in the target's velocity. However, when several targets are in the radar beam, or when the radar searches for an unknown target, the system 111 keeps track of difference frequencies for each range. As an example, if the radar system has a range of 100 miles and a resolution of 1 mile, it must have 100 different channels. One channel looks for difference frequencies from 1 mile away, another channel for targets 2 miles away, and another one for 3 miles, etc.

The outputs from each of the mixers 118 are applied in parallel to time compression circuitry shown in dotted block 120. The technique of time compression by a factor of the number of input channels can be demonstrated with the aid of FIG. 4. Only 3 channels are shown, but the technique may easily be extended to M channels with a compression factor of M. Only the sample points are shown for each of the channels, and the original and reconstructed waveforms for clarity but either analog or N bit quantization could be used. The samples are taken on a continuous basis from each channel in succession at a rate somewhat greater than twice the bandwidth of the individual channels. For example, all channels would have the same bandwidth, or at least the sampling is based on the channel with the greatest bandwidth, although there is a certain amount of flexibility in using different sampling rates for different input channels in integral multiples.

The time compression circuitry 120 includes a channel multiplexer 122 which receives the signals from each of the radar channels. The multiplexer 122 samples the signals from each of the channels rapidly in succession and applies the signals to an analog-to-digital converter 124. Since radar echoes are analog signals, they must be converted to digital form to be stored in the memory 130, unless the input signals are already in digital form, and then converted back to analog form in digital-to-analog converter 131 when being read out for analysis. Unless the filter bank 140 employs digital techniques such as a Fast Fourier Transform processor or digital filters. Since the loading and unloading are completely simultaneous, separate analog-to-digital and digital-to-analog converters must be employed. A random access memory 130, which for purposes of discussion of the embodiment of the invention in FIG. 3 is a three-dimensional random access core memory, is coupled to the converters 124 and 131. Timing and control circuitry 132 is coupled between the memory 130 and the multiplexer 122.

The time compression circuitry 120 fills the core memory 130 with samples from the various channels and simultaneously and interleaved therewith the samples are read out to a filter bank 140 channel by channel. The output signals from the time compression circuitry 120 are applied to a spectrum analyzer 139 which includes the filter bank 140, a switching network 142 to which the filter bank 140 outputs are applied, a computer 144 and a display 146. The size of the memory 130 is determined by the number of channels, M, the channel sample rate SB, and the amount of time, T, the computer 144 requires to process all the data in one channel. Thus, SBT samples are taken from each channel with each cycle of processing and the capacity of the memory 30 must be at least MSBT samples.

The most difficult part of using the compression techniques in a radar system is the discovery of an addressing scheme that allows the economical use of the storage at an adequate speed. The operation of a core time compression system utilized in the embodiment of the invention shown in FIG. 3 depends on the ability of the computer 144 to process the data in the memory 130 at a speed considerably faster than the data's arrival rate. Therefore, the computer 144 has a speed which is M times the data rate so that the computer 144 can analyze M channels without losing any data.

The simple three channel system shown in FIG. 3 illustrates the principle of time compression as applied in the present invention. The channel multiplexer 122 connects channel 1 to the core memory 130 through the analog-to-digital converter 124. The time compression circuitry 120 takes one sample from channel 1, converts it to digital form in converter 124 and then stores it in core memory 130. Then a sample is taken from channel 2, it is converted in converter 124 and stored in memory 130. This process is then repeated for channel 3. After the first sample from channel 3 has been stored, the second sample from channel 1 is taken. The sampling rate of each individual channel is at least twice the highest frequency of the signal in that channel or otherwise, the reconstruction signal might contain spurious frequencies and thus not truly represent the original signal. As the memory 130 collects many samples from each channel, the information from channel 1 is converted back to analog form by simultaneously therewith converter 131 and is then applied to the filter bank 140 of spectrum analyzer 139. Samples from channels 2 and 3 are similarly analyzed and computer 144 determines the position and speed of the target from the output of the filter bank 140. The readout is much faster than the readin, the ratio of readout rate to readin being a multiplying factor that adjust the analysis to compensate for this speed change.

MEMORY

Figure 4:
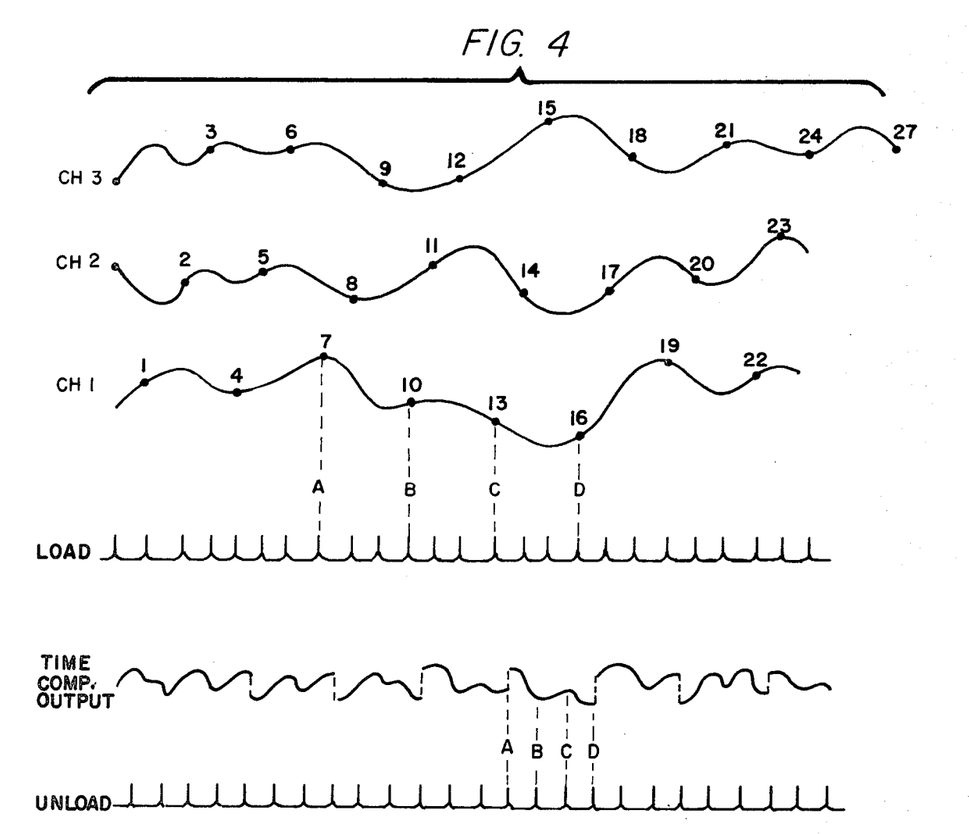
FIG. 4 shows waveforms illustrating the technique of time compression.

Again, considering FIG. 4, the samples are loaded or placed in the memory 130 at an appropriate location such that they can be later retreived in order from a given channel. The samples A, B, C and D from channel 1 were read out of the memory at a three times faster rate with the unload signal. The load and unload commands derived from timing and control circuitry 32 are time interlaced such that the memory sample rate must be at least twice the load and unload rate. If the memory 130 had excess capability other functions could be interlaced in time. Generally, the samples loaded and unloaded are evenly spaced and continuous for the operation. If it was desired to time compress by a factor of two times the number of channels, the unload rate would simply double and each couple of samples A, B, C and D would be fed back to the memory 130 and read out again. Compression by less than the number of channels can be accomplished by having more than one output. In this way the memory can unload more than one sample simultaneously. This flexibility is useful in systems where the compression ratio becomes higher than is practical and desirable. If the memory load rate is also higher than desired, more than one sample can be introduced in parallel in a similar fashion to reduce the memory load rate.

In understanding the present invention it should be shown how a memory with a geometry in the form of a plane or rectangle can be used for time compression. Other geometrys such as a lines, cylinders, disks, etc., are also useful, the limitation of the memory being the speed and method of access. Random access of a memory is defined as the ability to load or unload a sample at any given location or address in a given period of time. As an example of a time compressor with a random access rectangular memory matrix, refer to FIG. 5. This could be an array of magnetic cores so commonly used in computer systems, but it should be noted that any random access memory can be used for time compression.

Figure 5:
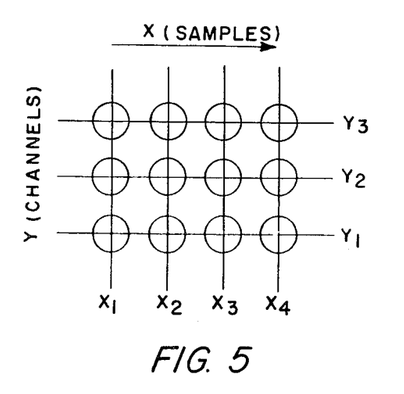
FIG. 5 shows a random access rectangular memory matrix.

In FIG. 5, there are twelve unique addresses: $X_1Y_1$, $X_1Y_2$, etc. The time compression as shown in FIG. 4 can be accomplished with the matrix of FIG. 5 by loading in the Y direction, bottom to top, and left to right in sequence and unloading from left to right, bottom to top, in the X direction such that sample 1 from channel 1 is placed in $X_1 Y_1$ and sample 1 from channel 2 is placed in $X_1X_2$; sample 1 from channel 3 in $X_1Y_3$, and sample 2 from channel 1 in $X_2Y_1$; sample 2 from channel 2 is placed in $X_2Y_2$, etc. Unloading is done at right angles, or orthogonal to loading, in order to place all the samples in a given channel in sequence, whereas loading was done on a channel-to-channel basis. Therefore, to unload samples 1, 2, 3 and 4 from channel 2, etc., the repeating channel 1 after channel 3, etc., it is necessary to unload $X_1Y_1$, $X_2Y_1$, $X_3Y_1$, $X_4Y_1$, $X_1Y_2$, $X_2Y_2$, etc.

Random access addressing allows loading in one direction and unloading in the opposite direction, in addition to other advantages to be discussed subsequently. The various parameters of time compression are:

M — Number of input channels
B — Bandwidth of each channel
S — Sample factor
P — Number of bins per channel
T — Processing time, also referred to as dwell time
or
N — The number of bits taken for each sample by the analog-to-digital converter.
$\theta_R$ — The read phase of the clock
$\theta_W$ — The write phase of the clock The processing time T is reduced by the compression factor M in the example. The memory capacity is:

Memory Capacity — SBMT       (1)

since samples are taken at a rate SB from M channels for T seconds. The memory rate is:

Memory Rate — 2SBM       (2)

since the memory must be completely loaded and unloaded of its capacity each T second.

In the example, the memory capacity was twelve. Typical systems might require capacities in the tens, hundreds of thousands, or even millions. The length Y is equal to the number of channels, and X is equal to the number of samples per channel. With a change in the addressing program, more than one line could be assigned to each channel, reducing the length of the X or Y at the expense of the other. A memory such as a core memory is word addressed, that is, only a single word can be either loaded or unloaded at a time. The rate is held to practical limits.

A data rate problem can exist for two distinct reasons. First, the input samples may exist at a rate greater than the memory load rate. Second, the unload word rate may not be fast enough to allow the desired compression factor. The first situation (sample rate greater than memory load word rate) can be improved by loading more than one sample at a time. The sample rate can be greater than the word rate of the memory by factors of the number of samples per word. The second problem (memory unloaded word rate not great enough for the desired compression) can be eliminated by programming the memory with more than one sample per word. The word is unloaded at the memory word rate into a shift register that allows a parallel to serial conversion and a signal speed up equal to the number samples per word.

TEN CHANNEL TIME COMPRESSION SYSTEM

One core time compression system employing the present invention which has been built has 10 channels (not shown), corresponding to the radar systems' ability to detect targets at 10 different distances. Within each channel, the band of detectable frequencies ranges from 200 to 900 hertz, corresponding to the velocity limits of the targets picked up. Each channel is sampled at a 2-kilohertz rate. An adequate sampling rate would be 1.8 khz—twice the highest signal frequency of 900 hz—but a 2-khz rate offers a margin of safety. After each sample is converted into digital form, it's stored in a memory location corresponding to the sampled channel. The samples for all 10 channels come from a 20-khz oscillator, so that each sample is wide enough—50 $\mu$ sec—to allow plenty of time for the conversion process and storage cycle to continue.

The compressor samples the channels for 300 msec, collecting 600 sample words from each channel. The MSBT product is (10) (2.22) (900) (0.3) = 6,000 meaning that the memory must be capable of holding 6,000 samples. The rate at which the stored information is transferred from the channels to the filter bank and thence to the computer is 1 msec per channel, so that the compression factor is 300 to one. Because of this speeding up, the output frequency band—60 to 270 khz—appears to be 300 times as high as it really is.

Aside from this factor of 300, the 1 msec signal from each individual channel is a stepwise approximation of the original analog input. Added to this compressed signal is a 5 Mhz carrier frequency to permit the use of standard crystal filters instead of the much larger and more expensive kilohertz-band filters. Thus, the actual frequency band analyzed by the filter bank is 5,060 to 5,270 khz. Difference frequencies — 4,730 to 4,940 khz—duplicating the information in the sum band are also present, outside the filter range.

FILTER BANK

Because the signal from a specific channel can be quite complex-reflecting several targets traveling at different speeds or a single target moving erratically--the difference frequency must be broken down into its various components. This is conveniently done by a bank of narrowband filters, each of which isolates a single component frequency from the received signal.

Suppose an individual channel picks up targets moving at speeds between 100 and 500 miles per hour at a range of 50 miles. The signal from this channel could be analyzed by a bank of, for example, 40 filters, one of which would produce an output if the difference frequency indicated the presence of a target traveling at between 100 and 110 miles per hour, another indicating a target velocity of 110 to 120; the next, 120 to 130, and so on. The 40th filter's output would correspond to a speed between 490 and 500 mph.

These filters by themselves cannot indicate whether a target is moving toward or away from the radar antenna, but the doppler effect can. The echo from an approaching target will be at a higher frequency than the transmitted signal, and at a lower frequency if the target is moving away. This effect, together with the output of the filter bank, gives complete information about the target's radial motion.

A target moving toward the receiver at a constant velocity generates a constant difference frequency that produces a steady output from one filter in a single channel. As the target comes closer to the receiver, the signal switches from channel to channel, producing outputs from corresponding filters in successive channels.

Most targets, however, don't move at constant speeds. They may, for instance, have transverse components; the radar can track only the radial velocity component. Even if the target is moving along an oblique line, the radial component changes only gradually in proportion to the cosine of the angle between the target's path and the line of sight. Or the target may be tumbling or rolling; as parts of it move at different velocities, a frequency modulation is set up in the difference signal.

As the target's velocity changes, its frequency—as produced by the radar—changes. This frequency variation plotted against time yields the target's signature, by which, for example, various satellites in orbit around the earth can be identified.

In the 10 channel core time compression system described above, the compressed band is analyzed by a bank of 200 bandpass filters with center frequencies equally spaced at 1.05 khz intervals and output-versus-frequency curves resembling the Gaussian, or bell-shaped, distribution. Filters with more nearly rectangular characteristic curves would be better suited for straight forward spectrum analysis, but part of the problem in a radar system is extracting the signal from a noisy background; Gaussian filters were better at extracting the signal.

The center frequency of each filter corresponds to a particular velocity of a target, and the filter with the maximum output therefore indicates the velocity. To assure that the outputs from the filter bank are as large as possible, even for frequencies between the center levels, the filter bandpass characteristics overlap. The bandwidth of each filter—measured between frequencies where the output is 3 decibels below that of the center frequency—is greater than the spacing between the center frequencies. Thus, the depth of the valley between adjacent peaks is only 2 db and no frequency is attenuated more than 2 db.

Figure 6A:
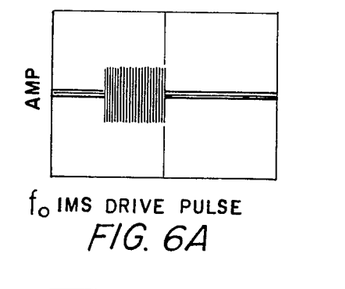
FIGS. 6A through 6G shows the waveforms resulting from the operation of the filter bank shown in FIG. 3.
Figure 6B:
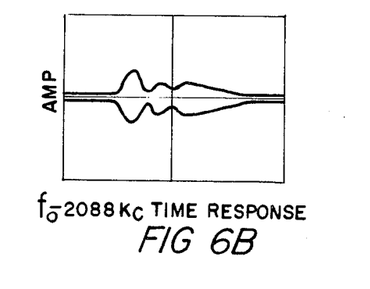
Figure 6C:
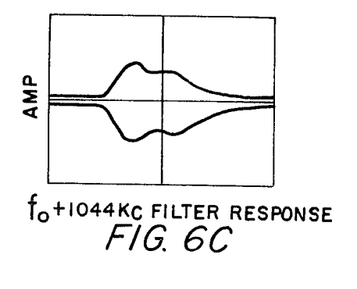
Figure 6D:
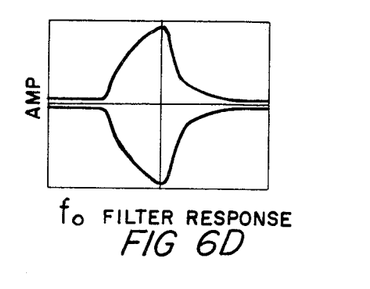
Figure 6E:
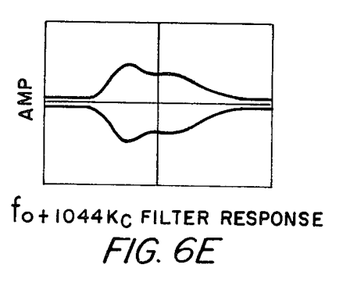
Figure 6F:
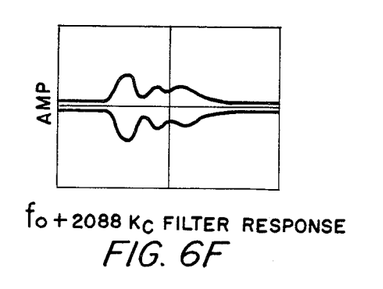

A 1 msec pulse of a single frequency is shown in FIGS. 6A-G with the outputs of five adjacent filters, one at the specific frequency to and the two closest 1,044 and 2,088 KC at higher and lower frequencies. These displays are of amplitude against time. FIG. 6A shows the 1 msec driving pulse of the high-frequency compressed signals. The time constant of the center filter's response to the input pulse is clearly visible in FIG. 6D and the similar, though more complex, responses of the side filters are also apparent in FIGS. 6B, C, E and F. These side filters produce outputs because the fast rise and fall of the single-frequency input signal create many other frequency components. As the filters are sampled in sequence while the 1 msec pulse is applied to their inputs, their outputs appear as pulses as shown in the amplitude versus frequency plot in FIG. 6G.

The total frequency content of the signal follows the curve $y = (\sin x)/x$, which resembles a damped sine wave. The duration of the input pulse determines the spacing between the local maxima of this curve; for a 1 msec pulse, the peaks are 1 khz apart, very nearly the same as the spacing of the various filters' center frequencies. This accounts for the outputs of the side filters. These outputs drop off rapidly, however, mostly because of the decreasing amplitude of the successive peaks in the $(\sin x)/x$ curve.

Figure 6G:
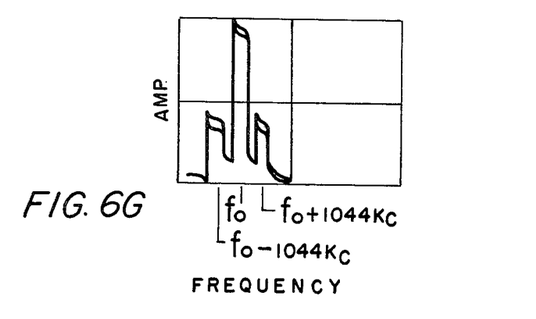
Figure 7:
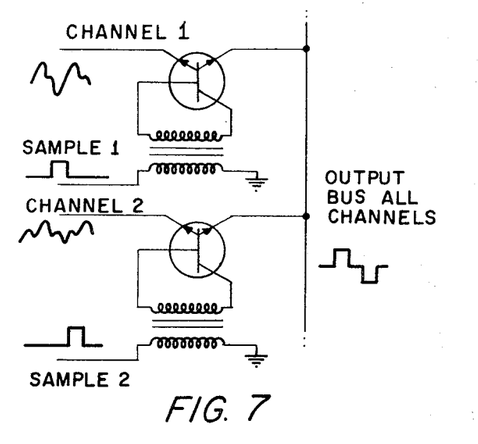
FIG. 7 shows the details of the analog gates used in the channel multiplexer shown in FIG. 3.

When the filter outputs are sampled in sequence at 1 sec intervals, the response takes the form shown in FIG. 6G. Although side lobes are still present, the input is essentially continuous when compared to the sweep frequency. The outputs of the filters adjacent (+ and − 1,044 KC) to the center filter are strongly attenuated, and the outputs of the next two are barely visible in this display. Other filters further removed from the main frequency produce no visible output at all.

CHANNEL MULTIPLEXER

In the prototype digital time compressor, a multiplexer such as 122 in FIG. 3 generates sample pulses at a frequency of 20 khz and distributes them in rotation to the 10 channels, so that each channel is sampled at a 2-khz rate. The system contains a 20 khz clock, a binary counter, a binary-to-decimal decoder (not shown) and 10 analog gates to do the actual sampling. The trailing edge of each clock pulse steps the counter, whose output is decoded to open a gate for the next clock pulse and to direct that pulse to the next channel.

The analog gates shown in FIG. 5, which are similar to transistor chopper circuits, each contain a dual-emitter transistor 150 having emitters 151 and 152 with a transformer 153 connected to its base 154 and collector 155. A sample line 156 connects the transformer primary winding 157 to the decoder output. When a positive pulse appears on line 156, both emitters 151 and 152 are forward biased and the transistor 150 admits the level of the analog voltage to the common output line 158 with hardly any change.

TIMING AND CONTROL

Figures 8, 9:
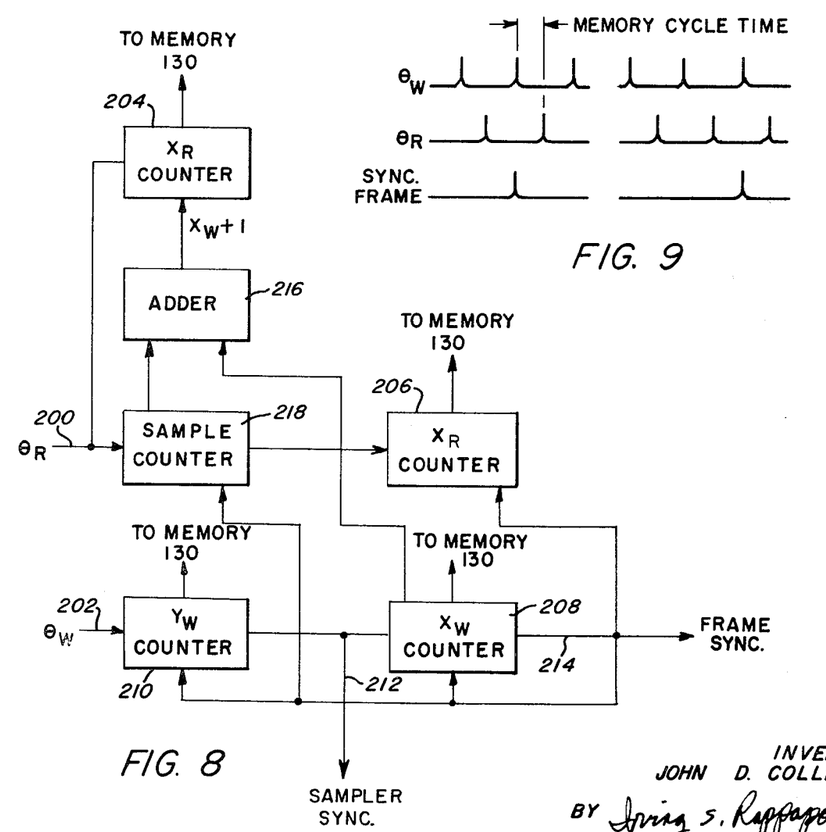
FIG. 8 is a detailed block diagram of the timing and control circuitry shown in FIG. 3.
FIG. 9 shows the relationship of various timing and control signals used in conjunction with the circuitry in FIG. 8.

There are two alternative embodiments for the timing and control circuitry 132. One embodiment of timing and control circuitry 132 is shown in FIG. 8. This embodiment interleaves reading and writing by using separate read and write address logic. FIG. 8 shows a two-phase clock $\theta_R$ and $\theta_W$ on lines 200 and 202 which control the alternate reading and writing which occurs simultaneously on a time-shared interlaced basis. Since the memory is three-dimensional it has three axes—X, Y and Z. There are separate X and Y axis read address counters ($X_R$ and $Y_R$) 204 and 206 respectively and separate X and Y axis write address counters ($X_W$ and $Y_W$) 208 and 210 which are orthogonal.

Data samples are taken from the channel multiplexer 122 each $\theta_W$ clock time, converted to digital words of N bits by converter 124 and loaded into memory 130 at locations specified by the $X_W$ address counter 208 and $Y_W$ address counter 210. As each sample is taken, the $Y_W$ address counter 210 is advanced by one count. When a Y column of M samples is completed, the $Y_W$ counter 210 overflows and increments the $X_W$ counter 208 by one count. The $Y_W$ counter overflow also generates a sampler sync signal on a line 212 which begins a new cycle of sampling at channel 1. The $Y_W$ counter 210 divides by M, the number of channels. The addressing is designed such that a core location for writing will always be empty after it has been read out so that the need for clearing before writing is unnecessary. All M channels are sampled and written into the memory 130 continuously and in parallel. This write procedure continues until the memory 130 is full with new samples and a frame sync is generated on a line 214. The frame sync occurs on line 214 when the $X_W$ counter 208 overflows after a count of SBT samples. The frame sync is used to initialize all counters. FIG. 9 illustrates the relationship of $\theta_R$, $\theta_W$, and the frame synce, as well as the memory cycle time.

Simultaneously with the writing, reading is taking place on a time-shared interlaced basis. The read clock $\theta_R$ on line 200 and the write clock $\theta_W$ on line 202 are in quadrature. Reading out of the memory 130 destroys the data. No data is lost and all the samples are readout in original sequence so that all M channels are readout of memory 130 in series one after the other resulting in a compression of time by the factor M. The complete sequence of channel 1, channel 2, ... channel M is repeated each frame time of T seconds.

The beginning of the readout of any channel is at an $X_R$ location determined by the $X_W$ counter 208 plus a one added by an adder 216. The read operation is similar to write except that it is orthogonal and the initial value of $X_R$ is $X_W + 1$. A sample counter 218 divides by SBT and increments the $Y_R$ address counter 206 to indicate a new channel to be read out. Sample counter 218 also initializes the $X_R$ address. This insures that the oldest samples are readout first, that all samples are in proper order, and that no data is lost. The memory 130 is approximately half full at any instant in time. The read out of the memory 130 is digital and is converted to an analog signal in converter 131 for application to the spectrum analyzer 139.

In this approach, writing proceeds with one sample from every channel being stored before a second sample is entered. Reading clears all the samples from a single channel in the same sequence in which they were stored. But to stay ahead of the write operation, the reading must be staggered. While memory 130 stores samples in the memory in 1, 2, 3 order, channel by channel, it reads them out with the oldest sample in each channel, which is just behind the newest one read in. It jumps to the last sample for the channel, returns to the first sample, and ends with what was the newest sample when the channel readout began. Several newer samples have been read in while the readout proceeds; indeed the readout begins with the oldest sample in the channel and stops just short of the newest sample in the entire memory. The net result is that the memory is normally only half full, and when operation begins, the first few samples are read at irregular intervals, although in strict order. No data is lost.

Figure 10:
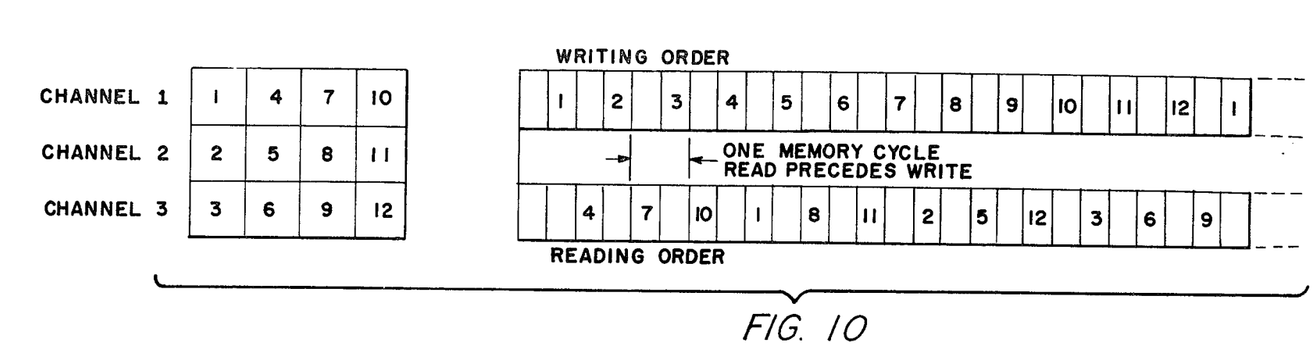
FIG. 10 illustrates the operating sequence of the circuitry shown in FIG. 8.

The sequence is illustrated in a small memory in FIG. 10 that stores four samples from each of three channels. Immediately after the first sample from channel 1 has been stored on the second or any subsequent pass through memory, the readout of this channel begins, starting with the second sample from the previous pass—bit 4 in the diagram. The four samples from channel 1 are readout in the order 4, 7, 10, 1, the last sample being the first one in the second pass. The readouts are interleaved with new samples being stored in other channels. It takes 12 memory cycles to write the four samples, but only four to read them out, giving a compression ratio of three. Right after channel 1 is readout, the operation switches to channel 2, taking the samples in the order 8, 11, 2, 5; channel 3 is then readout in the order 12, 3, 6, 9.

This operation requires one address register for reading and another for writing for each axis as shown in FIG. 8. One register increments by memory rows and the other by columns, with an especially large increment at the end of each channel readout. If, in the three-by-four example, the memory locations were numbered in the same sequence as the written samples, one address register would always increment by one and the other would increment by three. Further, the second register would increment by seven after every readout from a position on the diagonal positions 1, 5 or 9.

The addressing scheme provided by the timing and control circuitry shown in FIG. 8 can be used efficiently for linear scan, continuous multi-channel processing.

Figure 11:
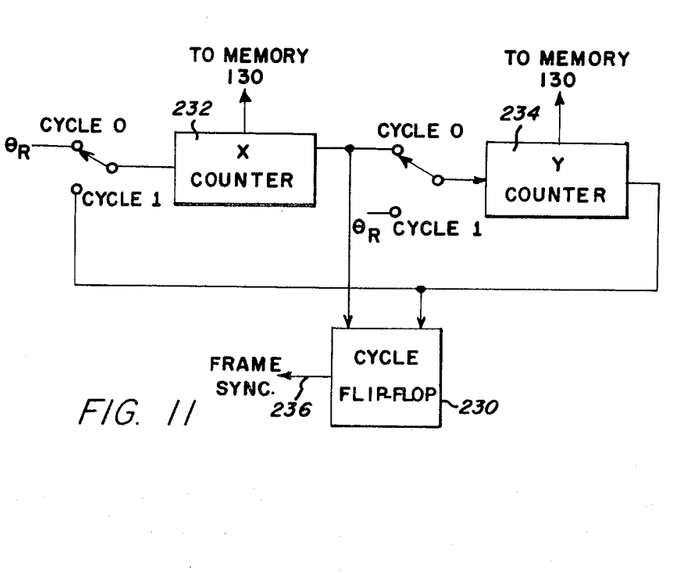
FIG. 11 is an alternative embodiment of the timing and control circuitry shown in FIG. 3.

The alternative embodiment for the timing and control circuitry 132 is shown in FIG. 11. This embodiment also interleaves reading and writing but it manages to keep the memory 130 nearly full at all times and needs only one set of address registers. As the samples for any one channel are readout, other samples from other locations are stored in the same locations. In successive passes through the memory, therefore, the channel orientation are at right angles—that is, samples from successive channels stored in a row on one pass are stored in a column on the next pass. A short interval between reading and writing gives time to modify the data. This operation is referred to as read/modify/write or split-cycle operation.

The technique performed by the embodiment in FIG. 11 is known as the rotating corner turner and uses only a single address program to keep the memory full by placing new samples in the locations just vacated by old samples removed for processing. This technique can best be understood by utilizing a simple memory matrix with M channels and M samples per channel. In the static corner-turner, either the X or Y dimension could be assigned to channels or samples and loading and unloading was orthogonal and never changed after initial designation. A given sample from a particular channel is always in the same unique location. With the rotating corner-turner, the load and unload directions will be interchanged on a cyclic basis to effect certain simplifications.

Assume that each T seconds M samples will be taken from M channels and placed in the M × M memory matrix one sample at a time. The memory is full and unloading in compressed time may begin. For continuous processing, new samples are still entering the memory and must be placed in the locations where the old ones are removed. The load rate and the unload rate is exactly the same and equal to M samples each T seconds. The compression ratio is M since the M samples from each channel were accumulated over T seconds but are readout and processed in T/M seconds.

The most significant characteristic to be noted is that the memory is always full and each new sample is placed in the location just vacated by the oldest sample just removed. As a result, the loading direction rotates between horizontal and vertical on each cycle and the unload direction is always orthogonal the load direction for any given channel. Also, the basic scheme so far discussed requires a square matrix; that is, the number of channels equals the number of samples per channel to be processed each T seconds. The addressing of memory cells is done sequentially with a single address program vs. two for a static corner-turner.

The rotating corner-turner lends itself to the step-scan as well as linear scan in a real time application. Samples accumulated during a dwell time are carried over to the next step and the new samples are simply placed in memory cells as they are vacated by removal and processing of the samples taken during the previous dwell time. The static corner-turner operates in real time for all practical purposes and is half full on the average. In order to step to a new scan location and load new data, time must be allowed to remove the old samples.

It is not always possible or desirable to have a square matrix but the method still applies if the matrix is treated as a group of square matrixes, that is, channels and samples must be an integral ratio and that the resulting rectangle is a group of squares. The actual physical memory does not need to have a square configuration. For example, it could be any standard computer random access memory with sufficient speed and memory capacity.

Figure 12:
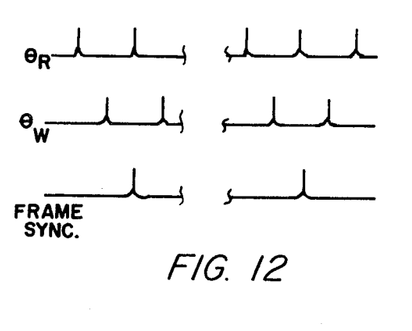
FIG. 12 shows the relationship of various timing and control signals used in conjunction with the circuitry in FIG. 11.

In FIG. 11, data samples are taken from the channel multiplexer each $\theta_W$, converted to digital words of N bits in converter 124 and loaded into XY in the memory 130. FIG. 12 shows the relationship of $\theta_R$, $\theta_W$ and the frame sync.

New samples are written into the location vacated by the old sample just read. There are two cycles of operation 0 and 1 as determined by a cycle flip-flop 230. The cycle alternates each dwell or processing time. Cycle 1 reads samples in the Y direction and channels in the X direction. Cycle 1 writes channels in the Y direction and samples in the X direction. Cycle 0 reads samples in the X direction and channels in the Y direction. Cycle 0 writes channels in the X direction and samples in the Y direction. The data readout during cycle 0 was written during cycle 1 and vice versa. A read is followed by a write of a new sample into an empty memory location.

The memory addresses are X and Y counters 232 and 234 respectively and each increments in value one count each $\theta_R$. X counter 232 increments during cycle 0 and Y counter 234 increments during cycle 1. At the end of either cycle, the XY address is channel M sample SBT. The next $\theta_R$ pulse generates a frame sync on line 236 and changes the cycle flip-flop 230. The XY address begins at channel 1 and sample 1. After frame sync, samples are read from successive X locations (cycle 0) or successive Y locations (cycle 1). All M channels are sampled and written into the memory 130 continuously and in parallel. No data is lost and all samples are readout in original order in series one after the other resulting in a time compression by a factor of M.

Figure 13:
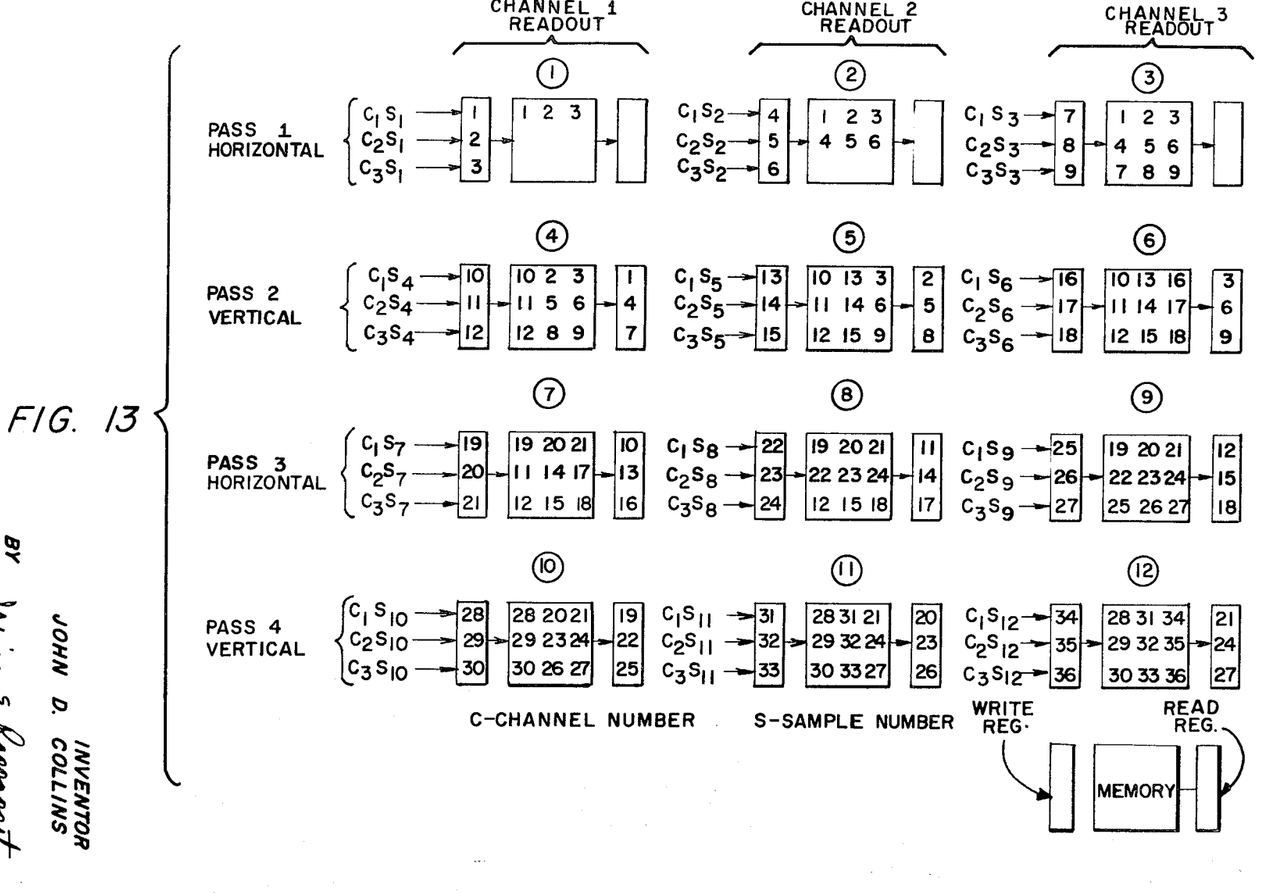
FIG. 13 illustrates the operating sequence of the circuitry shown in FIG. 11.

This method of operation is best illustrated by the three-channel system shown in FIG. 13 with three samples for each channel. At the start of operation, the memory may be assumed to be empty, although clearing it isn't a prerequisite. The first three read cycles yield no useful information; nothing has been stored in those locations yet. The first three write cycles each load one sample from each of the three channels in locations represented as horizontal rows.

In the second pass, data is taken from the memory column by column, with each column containing all the samples from a single channel. Following the readout, new samples from the three channels are stored in those same locations. Because channel data occupies rows in the memory at this point, readout in the third pass occurs row by row again. New samples are then stored from the three channels in each location cleared by reading, setting up data for the fourth readout, once more by columns.

The embodiment in FIG. 11 can be used efficiently for linear or step scan such as in phased arrays but because of the dynamic coordinate rotation, it is limited to use in applications where the number of channels is an integral multiple of the number of samples taken per channel.

VARIATIONS IN THE BASIC TIME COMPRESSION SYSTEM

The core memory described in this application could be replaced with some other random access memory such as integrated circuit or LSI memories or a sequential memory that exhibits equivalent features such as shift register memories or accumulators. With minor change, either of the addressing embodiments of FIGS. 8 or 11 could be used for batch processing. First, the memory would be loaded with samples; second, the samples would be readout in compressed time and generally placed back into the same location. In this fashion, the data could be repeated as often as desired. This mode would not take advantage of the continuous real time feature of the time compression system. The embodiment of FIG. 8 could be used for non-interlaced read and write, and in such an arrangement only a single X and Y counter is required as is described in co-pending application Ser. No. 787,506.

Longer dwell times T can be achieved with reduced channel capacity M by simply strapping the channel multiplexer. For example, channel 1, 2 and 3 become Channel A, Channel 4, 5, 6 become Channel B, etc. and the dwell is increased three times. Overlapping processing of dwell time can also be achieved with strapping of the channel multiplexer at the expense of reduced channel capacity. For example, channel 1 and channel M/2 are both converted to channel 1 such that channel 1 is readout twice during the dwell time T for a 50 percent overlap. This is sometime used to reduce time straddling loss during a linear antenna scan.

More than one time compressor can be used in parallel to lower the compression ratio and data rate. More than one sample can be used each memory cycle to lower the data rate and yet maintain the compression ratio of M. Time compressors in accordance with this invention can be compounded to accomplish the time compression in greater than one step.

Compression ratios of greater than M can be achieved with a small time compressor register at the output to repeat the samples. When paralleling the sampling to lower memory data rate by a factor of V, the memory word length increases by $V^2$ as compared to reading and writing a single sample at a time. A shorter word then $NV^2$ in the major memory can be when paralleling to reduce memory data rate with the use of a minor memory; before entering samples in the major memory, or after removing samples from the major memory, or in both places. The memory capacity of major memory is still MSBT samples while the minor memory is SBT times the shorting factor V. The minor memory is much smaller and can be a different type and faster in some cases to allow additional time compression.

A further use of a minor memory in a compound time compressor is to even out irregular data rates. For example, in a pulse doppler radar, the range gates are sometimes grouped in bunches. The samples can be held in the minor memory used in the case for both buffer storage and reformatting. If the minor memory had a capacity of one pulse repetition frequency time then two samples can be written into the major memory at a time reducing the data rate of the major memory.

Time compression can do as much for radar signal processing as time sharing has done for computerized airline reservation systems or bank bookkeeping. With this new technique, a single radar system can track several targets at once or search a wide expanse of sky.

Although primarily developed for large radar networks, the approach could be applied wherever a multiplicity of analog signals has to be analyzed and correlated. For example, the signals from many electrocardiograms, blood-pressure sensors, the other biomedical devices could be processed together in the same unit. The more channels there are to be monitored, the more advantages time compression offers, and these advantages can be realized without inordinately complex hardware.

A primary feature of the present invention is the incorporation of addressing schemes which permit the reading and writing to be simultaneously interleaved which provides more efficient and economical signal processing.

I claim:
1. In combination:
means for sequentially sampling input signals from each of a plurality of channels;
means for storing digital data signals derived from said signal samples in a storing sequence and for reading said data from said storing means in a reading sequence;
said storing sequence being different from said reading sequence; and
said data being read during time periods between the time period during which each sample is taken from each of said channels.

2. The combination in accordance with claim 1 wherein analog signals reconstructed from said data signals read out of said storing means are fed to a filter bank.

3. The combination in accordance with claim 2 wherein said filter bank comprises a plurality of frequency responsive filters responsive to respectively different frequency bands.

4. The combination in accordance with claim 1 wherein said signal samples are converted to digital data signals at a predetermined rate.

5. The combination in accordance with claim 4 wherein digital signals read out from said storing means are fed to a digital-to-analog converter to convert said digital signals to analog signals.

6. The combination in accordance with claim 5 wherein said analog signals are fed to a multichannel filter.

7. The combination in accordance with claim 6 wherein said multichannel filter comprises a plurality of frequency responsive filters.

8. The combination in accordance with claim 7 wherein the outputs of said frequency responsive filters are fed to a switching network.

9. The combination in accordance with claim 8 wherein the outputs of said frequency responsive filters are fed through said switching network to a common channel.

* * * * *